US011544093B2

(12) United States Patent
Wang et al.

(10) Patent No.: US 11,544,093 B2
(45) Date of Patent: Jan. 3, 2023

(54) VIRTUAL MACHINE REPLICATION AND MIGRATION

(71) Applicant: Intel Corporation, Santa Clara, CA (US)

(72) Inventors: Zhe Wang, Portland, OR (US); Andrew V. Anderson, Forest Grove, OR (US); Alaa R. Alameldeen, Hillsboro, OR (US); Andrew M. Rudoff, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 16/586,859

(22) Filed: Sep. 27, 2019

(65) Prior Publication Data

US 2020/0042343 A1 Feb. 6, 2020

(51) Int. Cl.
*G06F 9/455* (2018.01)
(52) U.S. Cl.
CPC .. *G06F 9/45558* (2013.01); *G06F 2009/4557* (2013.01); *G06F 2009/45583* (2013.01)
(58) Field of Classification Search
CPC ....... G06F 9/45558; G06F 2009/45583; G06F 2009/4557; G06F 2009/45562
See application file for complete search history.

(56) References Cited

U.S. PATENT DOCUMENTS

| | | | | |
|---|---|---|---|---|
| 10,152,381 | B1* | 12/2018 | Shvaiger | G06F 3/0661 |
| 2014/0164709 | A1* | 6/2014 | Guthrie | G06F 12/0804 |
| | | | | 711/134 |
| 2014/0351518 | A1* | 11/2014 | Chang | G06F 12/0811 |
| | | | | 711/122 |
| 2015/0100732 | A1* | 4/2015 | Guthrie | G06F 11/2043 |
| | | | | 711/122 |
| 2015/0370702 | A1* | 12/2015 | Voigt | G06F 11/2094 |
| | | | | 711/2 |

(Continued)

OTHER PUBLICATIONS

Dully, Brendan et al., "Remus: High Availability via Asynchronous Virtual Machine Replication", NSDI 2008: 5th USENIX Symposium on Networked Systems Design and Implementation, USENIX Association, Department of Computer Science, The University of British Columbia, Canada, pp. 161-174.

(Continued)

*Primary Examiner* — Lewis A Bullock, Jr.
*Assistant Examiner* — Kevin X Lu
(74) *Attorney, Agent, or Firm* — Compass IP Law PC

(57) ABSTRACT

Examples herein relate to checkpoint replication and copying of updated checkpoint data. For example, a memory controller coupled to a memory can receive a write request with an associated address to write or update checkpoint data and track updates to checkpoint data based on at least two levels of memory region sizes. A first level is associated with a larger memory region size than a memory region size associated with the second level. In some examples, the first level is a cache-line memory region size and the second level is a page memory region size. Updates to the checkpoint data can be tracked at the second level unless an update was previously tracked at the first level. Reduced amounts of updated checkpoint data can be transmitted during a checkpoint replication by using multiple region size trackers.

18 Claims, 10 Drawing Sheets

(56) References Cited

U.S. PATENT DOCUMENTS

2015/0378633 A1    12/2015  Sahita et al.
2016/0154663 A1*    6/2016  Guthrie ............... G06F 11/1458
                                                           718/1
2017/0329623 A1*   11/2017  Dong .................. G06F 9/45558

OTHER PUBLICATIONS

Hou, Kai-Yuan et al., "Tradeoffs in Compressing Virtual Machine Checkpoints", VTDC 2013: 7th International Workshop on Virtualization Technologies in Distributed Computing, Oct. 21, 2013, HP Laboratories, 9 pages.
Hou, Kai-Yuan, "Resource-Efficient Replication and Migration of Virtual Machines", Computer Science and Engineering, University of Michigan, 2015, 128 pages.
Intel, "Intel 64 and IA-32 Architectures Software Developer's Manual", Combined vols. 1, 2A, 2B, 2C, 2D, 3A, 3B, 3C, 3D and 4, May 2019, Section 28 2.4 Sub-Page Write Permissions, pp. 3963-3965.
Svard, Petter et al., "Evaluation of Delta Compression Techniques for Efficient Live Migration of Large Virtual Machines", VEE '11, Mar. 9-11, 2011, Newport Beach, CA, USA, pp. 111-120.
Tamura, Yoshi, "Kemari: Fault Tolerant VM Synchronization based on KVM", NTT Cyber Space Labs, Aug. 10, 2010, 25 pages.

* cited by examiner

VIRTUAL MACHINE REPLICATION AND MIGRATION

TECHNICAL FIELD

Various examples described herein relate to virtual machine migration.

BACKGROUND

Virtual Machine Managers (VMMs) propagate changes made to guest virtual machines (VMs) in order to replicate the guest's state and support features such as high availability, live migration, and fault tolerance. In such usage models, each modification to a guest VM's memory must be identified and processed appropriately by the VMM. In many instances, this requires that the VMM communicate the change over a network to a cooperative VMM with a replica VM. The granularity of change detection may directly impact the amount of network traffic required. For example, if a guest VM changes a single 64-byte cache line, and the granularity of change detection is a 4 kilobyte page, then that small 64-byte change may result in 4 kilobytes of data being transferred to memory used by each replica VM. In cases where granularity of change detection is even larger, the amount of data copying may increase and can lead to inefficient use of memory and networking resources.

In Intel Architecture (IA) systems, memory modifications are typically tracked through accessed and dirty bit support provided by the memory management unit (MMU) or by marking pages read-only and recording the modification on the first write to each page. Supported MMU page sizes include 4 kB, 2 MB and 1 GB. With sub-page permissions, VMMs may write-protect 128-byte regions. For most memory-tracking applications, 4 kB pages are preferred. When 2 MB or 1 GB pages are used, prohibitive amounts of unmodified data must often be transmitted. While sub-page permissions allow 128-byte granularity, the cost of faulting and logging is high enough that this is undesirable for many usage models.

DETAILED DESCRIPTION

Figure 1:
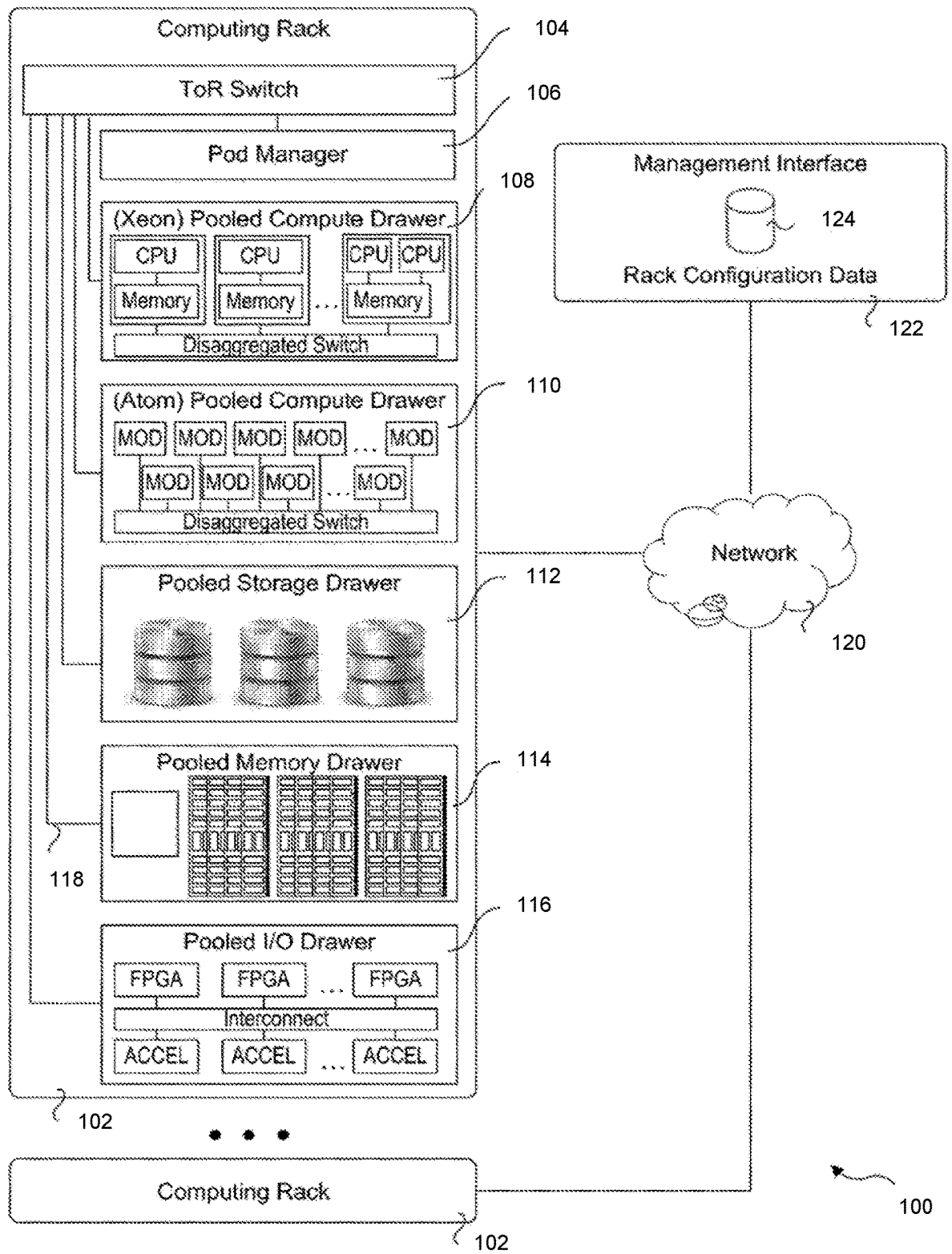
FIG. 1 depicts an environment.

Checkpoint replication is used to ensure virtual machine availability in the case of a system crash or power failure, and also for rapid migration of live and active VMs. During a checkpoint replication procedure, the checkpoint data is read from a host VM and sent over a network or fabric (or other communication medium) to a backup computing platform machine. If a system fails, a checkpoint can be used to start a VM or application at its checkpoint to avoid starting the VM or application from its beginning and avoid incurring latency as a result. Maintaining backup VMs can reduce loss of a VM's completed work caused by failure of a primary VM.

Checkpoint data can be a memory image of a VM or application at some time of execution. All changes in memory (e.g., cache and memory) by the VM or application are captured. In the VM context, a snapshot or checkpoint is a consistent full representation of the VM. A snapshot or checkpoint can be used to suspend a VM so that it can later be restored on the same platform, or migrated to a secondary platform. Checkpoint data can include log and replay records of low-level events executed by a VM during an execution interval, such as externally-directed I/O activity. The checkpoint data may include configuration information, CPU architectural state including values of all architectural and control registers, memory data changes since the last checkpoint including all modified data in various cache levels that have not been written back to memory, I/O device state, and any other information needed to bring up a VM at the same state as it was when the checkpoint was taken. The checkpoint data can be used to bring the backup VM to the same state as that of the primary VM. Checkpoint data can also be used for containers and operating backup or replica containers.

However, this protection of continuity of VM operation occurs at the expense of significant memory capacity and bandwidth and network bandwidth consumption. In many use cases, the largest component of all the checkpoint state that needs to be saved is the modified data in memory. Reducing the memory and network traffic caused by checkpoint replication can significantly improve memory and network system performance and reduce associated power consumption. To save space, VMMs monitor specific memory regions that contain data from the VMs that need to be checkpointed. For the monitored memory regions, only data that has been modified since the last checkpoint needs to be stored. Checkpoints could be used to store the state of the whole system, or could be used to store the state for only one or a few VMs.

A known current solution for guest VM replication uses a memory management unit (MMU). The MMU maintains a "dirty bit" for each page table entry that represents whether the page has been written-to since the previous checkpoint. During the checkpoint replication period, all the pages with the dirty bit set will be read from the memory and sent (e.g., over a network) to a backup machine. The software solution replicates the modified data at page granularity, which causes significant redundant data replication since a significant amount of clean data within modified pages are still copied. For instance, even if only 64 bytes within a 4 KB page is modified, the whole 4 KB page needs to be replicated in the backup machine. Thus, the current solution causes significant redundant memory and network traffic and increase processing costs (usages) and latencies for with data replication.

A paper, Kai-Yuan Hou, Kang G. Shin, Yoshio Turner, and Sharad Singhal, "Tradeoffs in Compressing Virtual Machine Checkpoints. In Proceedings of the 7th international workshop on Virtualization technologies in distributed computing (VTDC'13), ACM, New York, N.Y., USA, (pages 41-48)), proposes to use a compression technique to reduce the network traffic caused by checkpoint replications. That technique exploits the similarity of checkpoints and eliminates the redundant network traffic.

A more efficient solution uses differential updates, where it stores only the differences between the current modified page state and the state of the same page from the previous checkpoint. While this solution is space efficient, it requires reading the previous checkpoint's state before constructing the current checkpoint.

Various embodiments track modified content in a virtual machine's checkpoint data in either fine or coarse granularity-level (or both). A fine-grained modified page tracker can be used by a memory controller to keep track of dirty or changed checkpoint data at a fine-grained level (e.g., 64 byte or cache line level) since a prior checkpoint procedure was performed (e.g., started or completed). A coarse modified page tracker can be used by a memory controller to keep track of the dirty or changed checkpoint data at a coarse granularity (e.g., page or other size) since a prior checkpoint procedure was performed (e.g., started or completed). In some examples, changes to data tracked at a fine-grained level are not also tracked at a coarse level. During a checkpoint replication period or event, the modified checkpoint data are read from the memory and sent to a backup machine or memory as guided by changes tracked by the fine-grained and coarse modified page trackers. Due to fine-grained tracking, various embodiments can avoid copying a large portion of clean or unmodified checkpoint data, and therefore significantly reduce the redundant memory and network traffic and reduce power consumption. Fine-grained tracking saves checkpoint construction and reconstruction latency and processing, and also saves the space needed to store the checkpoint compared to coarse-grain tracking.

To enable efficient coarse-grained or fine-grained tracking of modified data, a limited amount of cache or memory space can be allocated to coarse and fine-grained modified page trackers. In some examples, in an event that insufficient cache or memory space are available for entries in the coarse modified page tracker, one or more entries can overflow to another memory or storage region that keeps track of checkpoint data changes at a coarse-level granularity of the same or lower level of granularity (e.g., page or larger in size) than that tracked by the coarse modified page tracker in cache or memory space. In some examples, an entry can include a single bit to indicate whether a fine-grained or coarse-grained region has been changed. For example, if a page is 4 kilobytes and any checkpoint data in the page has changed, a single bit in an entry in a coarse-grained modified page tracker can identify the page has changed (e.g., dirtied). In another example, if a cache line worth of checkpoint data has changed, an entry in the fine-grained modified page tracker that tracks changes to the cache line level can indicate the cache line has been changed (e.g., dirtied).

For example, various embodiments can provide for replication of 64 B of checkpoint data based on use of a 64 B fine-grained change tracker if a single 64 B (or smaller) store or update to checkpoint data occurs. If a 4 KB change tracker entry is used, any change to a 4 KB region used to store checkpoint data can lead to replication of 4 KB of checkpoint data even if only 64 B (or smaller amount) of the region has changed.

In some examples, data structures that store fine-grained and coarse-grained level entries can be encoded and compressed and available for backup at another memory or storage device. The encoded and compressed data structures can be used to identify changed addressable regions used to store checkpoint data. Another device can use the encoded and compressed data structures to determine what checkpoint data has changed and can request merely that data.

Accordingly, various embodiments can reduce memory and network traffic caused by checkpoint data replication. Memory bandwidth and networking resource can be freed for other uses than checkpoint replication and power consumption for systems can be reduced.

Tracking updates to a memory regions of interest is required for a variety of usage models. Various embodiments can reduce the resources required to track and process such memory modifications for use cases that do not require full checkpoints, including usages which may not require storage or transmission of the modifications.

Memory deltas are typically the largest component of checkpoint state updates. For a monitored memory region, the modified portions of this region are identified, and the delta representation is transmitted. Various embodiments can be used to track changes at fine or coarse granularity of any content stored in any region of memory regardless of the type of content. For example, the content can be checkpoint data, malware memory accesses in guest memory, or any other content.

The following provides an example of comparison among approaches to track updates to checkpoint data. In a first benchmark, a super page of checkpoint data (e.g., 2 MB) is allocated. Write requests are issued to each of the 4 KB pages. A second benchmark allocates a super page of checkpoint data (e.g. 2 MB). Write requests are issued to every single 64 B block in the whole super page. After checkpoint replication occurs, monitoring of both the network and memory traffic can occur using profiling tool such as VTune. The profiling results may show the memory and network traffic of the first benchmark is significantly smaller (e.g., $\frac{1}{64}$) of those of the second benchmark. However, using a coarse-grained, 4 KB-page-level, modified tracker will write the same amount of data to the checkpoint in both benchmarks. A fine-grained, 64-Byte cache line, modified tracker will store $\frac{1}{64}^{th}$ of the data in the first benchmark compared to the second benchmark.

FIG. 1 depicts an environment 100 includes multiple computing racks 102, each including a Top of Rack (ToR) switch 104, a pod manager 106, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 108, and Intel® ATOM™ pooled compute drawer 110, a pooled storage drawer 112, a pooled memory drawer 114, and a pooled I/O drawer 116. Each of the pooled system drawers is connected to ToR switch 104 via a high-speed link 118, such as a 40 Gigabit/second (Gb/s) or 100 Gb/s Ethernet link or a 100+ Gb/s Silicon Photonics (SiPh) optical link. In one embodiment high-speed link 118 comprises an 800 Gb/s SiPh optical link.

Multiple of the computing racks 100 may be interconnected via their ToR switches 104 (e.g., to a pod-level switch or data center switch), as illustrated by connections to a network 120. In some embodiments, groups of computing racks 102 are managed as separate pods via pod manager(s) 106. In one embodiment, a single pod manager is used to manage all of the racks in the pod. Alternatively, distributed pod managers may be used for pod management operations.

Environment 100 further includes a management interface 122 that is used to manage various aspects of the environment. This includes managing rack configuration, with corresponding parameters stored as rack configuration data 124.

Figure 2:
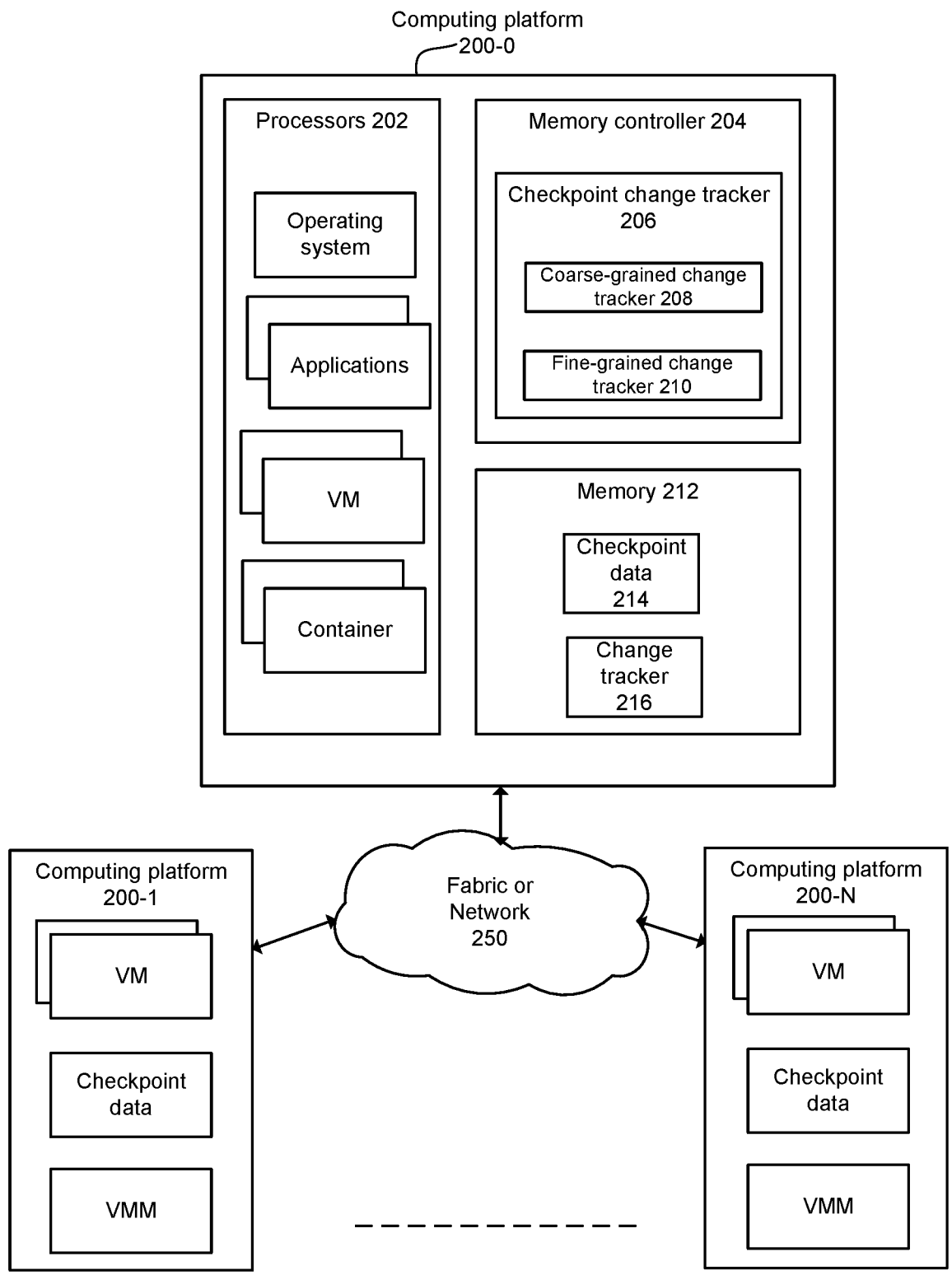
FIG. 2 shows a system in accordance with some embodiments.

FIG. 2 shows a system in accordance with some embodiments. In this example, computing platform 200 can represent any or all of computing platform 200-0 to 200-N, wherein N>1. Computing platform 200-0 can use processors 202 to perform computation and execute applications, operating system, and drivers as well as virtual machine (VMs) or container environments. Processors 202 can be one or more of: central processing unit (CPU), core, graphics processing unit (GPU), general purpose graphics processing unit (GPGPU), field programmable gate array (FPGA), High-Density Deep Learning (HDDL) compute engines (or other devices configured for machine learning or inference related operations), or Visual Compute Accelerator (VCA) (or other image, audio, or video processor). In some examples, processors 202 execute one or more virtual machine manager (VMM) and can represent one or more VMM.

A virtual machine can be software that runs an operating system and one or more applications. A virtual machine can be defined by specification, configuration files, virtual disk file, non-volatile random access memory (NVRAM) setting file, and the log file and is backed by the physical resources of a host computing platform. A container can be a software package of applications, configurations and dependencies so the applications run reliably on one computing environment to another. Containers can share an operating system installed on the server platform and run as isolated processes.

Memory controller 204 can receive read or write requests from processors 202 or other devices (e.g., any of computing platform 200-1 to 200-N) and manage at least read, write or erase operations with respect to content stored in memory 212. Memory controller 204 can be communicatively coupled to memory 212 using an interconnect or interface device. In some examples, memory 212 can store checkpoint data 214 and change tracker 216. According to some embodiments, memory controller 204 can use a checkpoint change tracker 206 to identify changes made at fine-grain or coarser levels of a memory region. For example, with respect to checkpoint data 214, checkpoint change tracker 206 can identify changes made to checkpoint data 214 at a fine-grain or coarser levels. For example, a fine-grain level can be at a cache line level (e.g., 32 bytes, 64 bytes, 128 bytes, or other multiples of 16 bytes or other numbers of bytes). A coarse-grain level can be page sized (e.g., 2 kilobytes, 4 kilobytes, 8 kilobytes, 16 kilobytes, or other multiples of 2 kilobytes, or other sizes).

Checkpoint change tracker 206 can use coarse-grained change tracker 208 to track changes to checkpoint data 214 at a coarse level. Checkpoint change tracker 206 can use fine-grained change tracker 210 to track changes to checkpoint data 214 at a fine-grained level. In some examples, checkpoint change tracker 206 tracks any received requested changes (e.g., writes) to a region of memory 212 that stores a portion of checkpoint data 214. Checkpoint change tracker 206 determines if an entry in coarse-grained change tracker 208 is present that indicates that a coarse level region of memory that stores checkpoint data 214 has been indicated as changed since a completion of a prior checkpoint period or procedure. If such entry is present and valid in coarse-grained change tracker 208, the change has already been accounted for at a coarse level. If such entry is not present or is not valid, then changes to a region of memory that stores checkpoint data 214 are tracked at a fine-grained change tracker using fine-grained change tracker 210.

If there is no valid entry associated with the address in coarse-grained change tracker 208, checkpoint change tracker 206 can retrieve from change tracker 216 an entry that corresponds to a coarse level region of memory that stores a portion of checkpoint data 214. Checkpoint change tracker 206 can store the retrieved entry into coarse change tracker 208. If the retrieved entry is valid and shows a change has been made at the coarse level region of memory, the change has already been tracked and an entry is available for use in coarse-grained change tracker 208 corresponding to the coarse level region of memory. If the retrieved entry does not show a change has been made at the coarse level region of memory, the retrieved entry may not be stored in coarse change tracker 208 and instead, checkpoint change tracker 206 can attempt to track changes at a fine-grained level.

Checkpoint change tracker 206 can determine if an entry is present in the fine-grained change tracker 210 corresponding to the write request. If a valid fine-grained entry is present in fine-grained change tracker 210 and is marked as indicating a change was made to the corresponding fine-grained region of memory, then the change is already tracked at a fine-grained level. If a valid fine-grained level entry in fine-grained change tracker 210 is not present or is not marked as indicating a change was made to the corresponding fine-grained region of memory, then a fine-grained entry is created and added to fine-grained change tracker 210 to identify a change to checkpoint data 214 at a fine-grained level. The entry is added and the changed region is marked to identify a change at the fine-grained level.

In some cases, if fine-grained change tracker 210 is full and a fine-grained entry is to be added, eviction of a fine-grained entry can take place and the evicted fine-grained entry is selected based-on one or more of: least recently used (LRU), cache line (or fine-grained) entry with a most number of modifications indicated by modified bits, or an entry with least number of modifications indicated by modified bits, or any other eviction criteria. Eviction of a fine-grained entry from fine-grained change tracker 210 causes addition of an entry into coarse-grained change tracker 208 and tracking of change at a coarse-level using coarse-grained change tracker 208. In some examples, a separate backup can be provided in memory for fine-grained change tracker 210 and used to store evicted entries from fine-grained change tracker 210. In some cases, if coarse change tracker 208 is full, eviction of a coarse entry from coarse-grained change tracker 208 to change tracker 216 in memory 212 can take place. The evicted coarse level entry can be selected based-on one or more of: least recently used (LRU) or an entry with least number of modifications indicated by modified bits, or any other eviction criteria.

Accordingly, at a checkpoint replication procedure or at any point that the memory change set is desired, merely written-to, changed or updated checkpoint data 214 is replicated that corresponds to changed checkpoint data 214 determined based on changes to checkpoint data 214 tracked in coarse-grained change tracker 208, fine-grained change tracker 210, and change tracker 216. Tracking of written-to, changed, or updated portions of checkpoint data 214 can be of a desired portion of checkpoint data 214 that is less than a full amount of checkpoint data 214.

For example, a virtual machine manager (VMM) (e.g., a VMM executed by computing platform 200-1) or other software or hardware can cause the transmission of merely the checkpoint data 214 corresponding to changed regions of memory at a fine-grained or coarse-grained level. For example, if a fine-grained region is 64 bytes, then any of checkpoint data 214 corresponding to a fine-grained memory region that is identified as changed is transmitted to another device (e.g., any of computing platforms 200-1 to 200-N). In addition, if a coarse-grained level region is 4096 bytes, then any of checkpoint data 214 corresponding to coarse level memory region that is identified as changed is transmitted to another device (e.g., computing platform 200-1 or 200-N). Accordingly, as part of a checkpoint period in this example, a mix of zero or more 64 byte segments (or other sizes) and zero or more 4096 byte segments (or other sizes) including portions of checkpoint data 214 are transmitted to another device. A processor that executes a VMM or other process can merge checkpoint data changes with other checkpoint data that has not changed since a prior checkpoint operation. Composite checkpoint data including changed and unchanged checkpoint data can be used by a VM for backup or VM migration or container backup or migration. In some examples, checkpoint data can be used for migration, replication, or backup of VMs or containers.

Note that there can be different sets of checkpoint data that may be maintained for each of one or more VMs and changes to the checkpoint data can be tracked for any set of checkpoint data.

Data can be sent using fabric or network 250 in one or more of: Ethernet frames, or communications compatible with remote direct memory access (RDMA), InfiniBand, Internet Wide Area RDMA Protocol (iWARP), quick UDP Internet Connections (QUIC), or RDMA over Converged Ethernet (RoCE). Data can be copied or stored to virtualized storage nodes using a protocol such as NVMe over Fabrics (NVMe-oF) or NVMe. Fabric or network 250 can include a network, fabric, interconnect, bus, or medium that is to receive a packet can be compatible at least with Ethernet, PCIe, Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, CCIX, 3GPP Long Tenn Evolution (LTE) (4G), 3GPP 5G, and variations thereof.

Figure 3A:
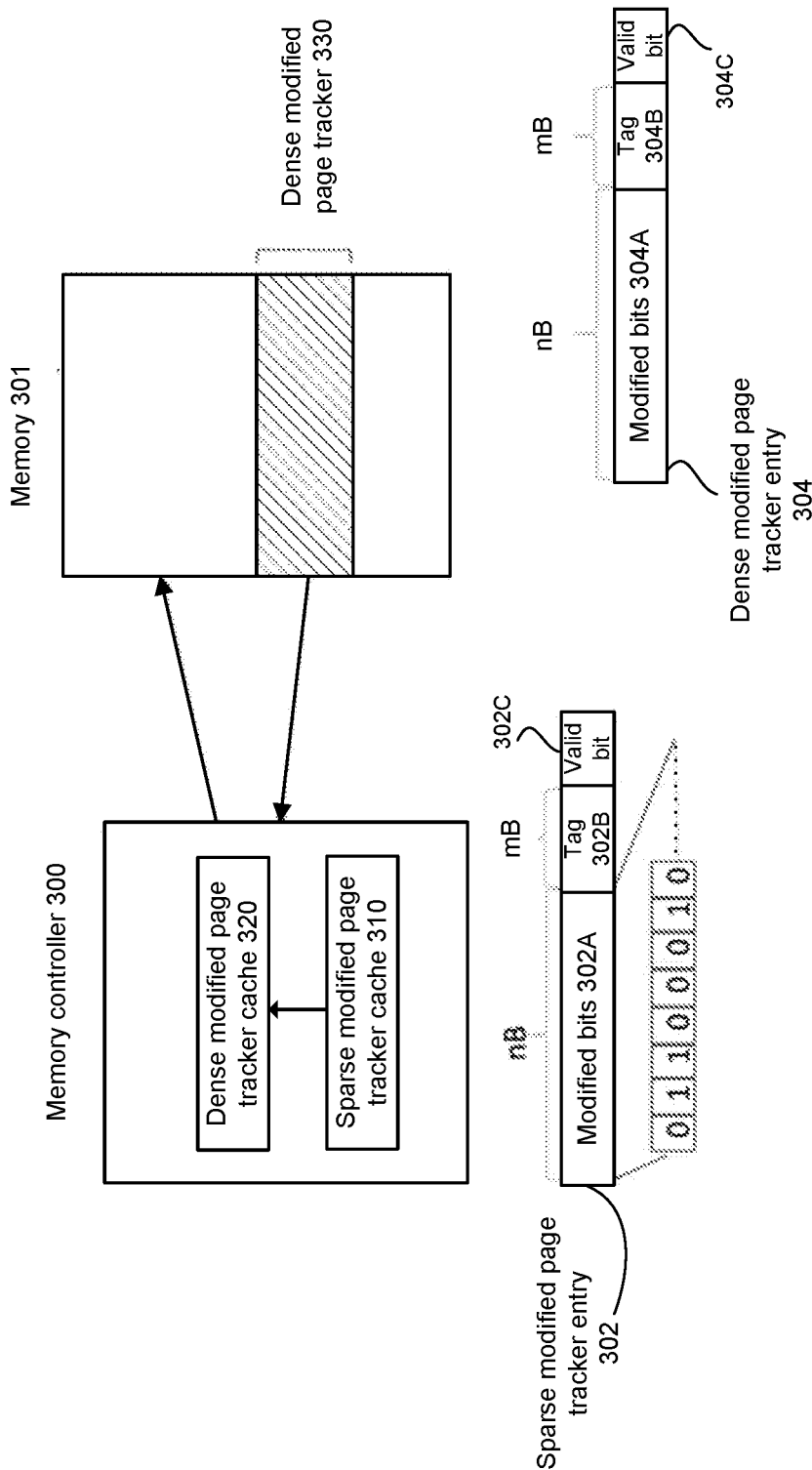
FIG. 3A shows a system for tracking changes to checkpoint data. In particular, formats of entries for sparse (fine-grained) and dense (coarse-level) trackers are shown.

FIG. 3A shows a system for tracking changes to checkpoint data. In particular, formats of entries for sparse (fine-grained) and dense (coarse-grained) trackers are shown. Sparse (e.g., fine-grained) modified tracker and dense (e.g., coarse-grained) modified page trackers are stored in a cache or memory used by memory controller, including in the same physical circuit or system-on-chip. Some of sparse and dense modified page trackers can be stored in volatile memory in a memory controller on the CPU side.

Sparse modified page tracker entry 302 can include modified bits 302A, tag 302B, and valid bit 302C. Modified bits 302A can be a bit string with length of n bytes. Each bit of modified bits 302A can indicate if any of a cache line granularity of a region of memory associated with an address is modified or not modified. Each bit of modified bits 302A is used to keep track of whether the corresponding data chunk (e.g., cache line in a page) has been modified or not. For example, if a page is 4096 bytes and a cache line is 64 bytes, n=8 so that 8 bytes (64 bits) are used to track all cache lines in a page with a starting address for the page indicated in part in tag 302B. For example, a particular entry 302 can correspond to multiple cache-line-sized regions in memory and another entry 302 can correspond to another group of multiple cache-line-sized regions in memory. The value "n" is configurable. For instance, n=8 means sparse modified 4096 byte page tracker cache 310 keeps track of the modified data at a 64 byte granularity (4096/(8 * 8 * 64)).

Tag 302B can include a most significant m number of bytes of physical page address after a chain of zero bits and can be a partial page address of a starting cache line for which contiguous cache lines are tracked using modified bits 302A. The value "m" can be 4 or 5 or other value.

Valid bit 302C can indicate whether a particular entry in a cache is actually used (e.g., valid) or not used (e.g., not valid) to track any cache line change. Valid bit 302C starts at invalid state when there are no changes tracked to a cache line but is set to valid if any cache line modification is tracked by the entry. For example, where modified bits 302A track modification of 64 cache lines, tag 304B can include a most significant 4 or 5 or other bytes of a starting cache line and the 63 other cache lines that follow.

Zero or more sparse modified page tracker entries 302 can be stored in sparse modified page tracker cache 310 corresponding to particular cache line sized memory regions that store a checkpoint data.

Dense modified page tracker entry 304 can include modified bits 304A, tag 304B, and valid bit 304C. Modified bits 304A can be a bit string of n bytes in length. Each bit of modified bits 304A can indicate if any of a page level of granularity of a region of memory and associated with an address is modified or not modified. For example, a particular entry 304 can correspond to a page sized region in memory and another entry 304 can correspond to another page sized region in memory. When modified bits 304A is 8 bytes (i.e., 64 bits) in length, modified bits 304A can track modification (or non-modification) of up to 64 adjacent pages starting at a physical address indicated in part by tag 304B.

Tag 304B can include a most significant m bytes of a physical page address after a chain of zero bits and can be a partial page address for which contiguous pages are tracked using modified bits 304A. For example, where modified bits 304A track modification of 64 pages, tag 304B can include a most significant 4 or 5 or other bytes of a physical page address and the 63 other pages that follow.

Valid bit 304C can indicate whether a particular entry is actually used (e.g., valid) or not used (e.g., invalid) to track any modification of a page. Valid bit 304C starts at an invalid state when there are no changes tracked in a group of pages but changes to valid if any page level modification is tracked by the entry.

Zero or more dense modified page tracker entries 304 can be stored in dense modified page tracker cache 320 corresponding to particular memory regions that store checkpoint data.

In some examples, a dense modified page tracker entry 304 tracks addresses at a super-page level, where a super-page contains N pages (e.g., 64 in the example shown in FIG. 3A). When N is a power of 2, no overlap can be guaranteed between super-pages. Each page belongs to only a single entry in the dense modified page tracker 330 and/or the dense modified page tracker cache 320.

Sparse modified page tracker cache 310 can be a set-associative structure and can be stored in a cache or memory device used by a memory controller. In some examples, sparse modified page tracker cache is 8 KB in size. Dense modified page tracker cache 320 can be a set-associative structure and can be stored in a cache or memory device used by a memory controller.

The following provides an example description of an operation of an embodiment. Receipt of a write request at memory controller 300 to modify check point data (not shown) causes an update of a tracker at cache line or page level. For example, a check is made as to whether changes to an address associated with the write request are tracked at a page level. For example, a check is made if an entry that tracks the associated address is present in dense (coarse) page tracker cache 320. If a valid entry is present in the dense (coarse) page tracker cache 320, then a change at the page level is already tracked and no updates to the tracker at page or cache-line level are to be made. The change can be tracked if a modified bit in the associated coarse entry is set.

However, if an entry is not present in the dense (coarse) page tracker cache 320, then memory controller 300 retrieves an entry from the dense (coarse) page tracker in memory 301 (e.g., DRAM array) for storage in dense (coarse) page tracker cache 330 in memory 301. If a valid entry is not present in the dense (coarse) page tracker 330 in memory 301, then memory controller 300 can proceed to track changes to the checkpoint data at a cache line level.

For tracking at cache line level using sparse modified page tracker cache 310, memory controller 300 checks to see if a valid entry is present for an address associated with the write request. If a valid entry with a modified bit for the associated address is present in sparse modified page tracker cache 310, then the change to checkpoint data was previously accounted-for and no updates to the tracker at page or cache-line level are to be made. If a valid entry is present in sparse modified page tracker cache 310 but the change to checkpoint data was not previously tracked using a modified bit, the modified bit is changed to indicate the change at the cache-line level.

In sparse modified page tracker cache 310, if no valid entry with a modified bit for the address associated with the write request is present, an entry is created with a modified bit associated with the address indicating the cache line is modified. In addition, a valid bit is set to "valid" for the entry and memory controller 300 stores the entry into sparse (fine-grained) page tracker cache 310.

In some cases, addition of an entry into sparse modified page tracker cache 310 or dense modified page tracker entry 320 requires eviction of a valid entry. In some cases, an invalid entry can be overwritten and no eviction takes place. An entry can be evicted from sparse modified page tracker cache 310 or dense modified page tracker entry 320 to make room for addition of an entry. For example, to evict a valid entry from sparse (fine-grained) page tracker cache 310 to add a new entry, an entry is evicted to dense (coarse-grained) page tracker cache 320 (which can also cause eviction of a valid entry to dense (coarse-grained) page tracker 330 in memory 301). Selection of an entry to evict can be one or more of: least recently used (LRU), cache line (or fine-grained) entry with a greatest number of modifications indicated by modified bits, or an entry with least number of modifications indicated by modified bits, or any other eviction criteria. In an example, eviction of a fine-grained entry can be based on whether a threshold number of cache lines (e.g., 32 cache lines out of 64 possible cache lines) are modified and changes are tracked at a page level. Eviction of a fine-grained entry from sparse (fine-grained) page tracker cache 310 can cause tracking of changes at a page (coarse-grained) level.

In some examples, an additional backing store in memory can be used to back-up the sparse modified page tracker cache 310. For example, evicted entries from sparse modified page tracker cache 310 can be stored in the backing store. A copy of the sparse modified page tracker cache 310 can be stored in the backing store.

Eviction of cache line level entries can occur between write requests at some period to clean up sparse modified page tracker cache 310 or dense modified page tracker cache 320 and provide space. Entries in sparse (fine-grained) page tracker cache 310 can be marked as invalid and changes tracked at a coarse level in dense modified page tracker cache 320.

Figure 3B:
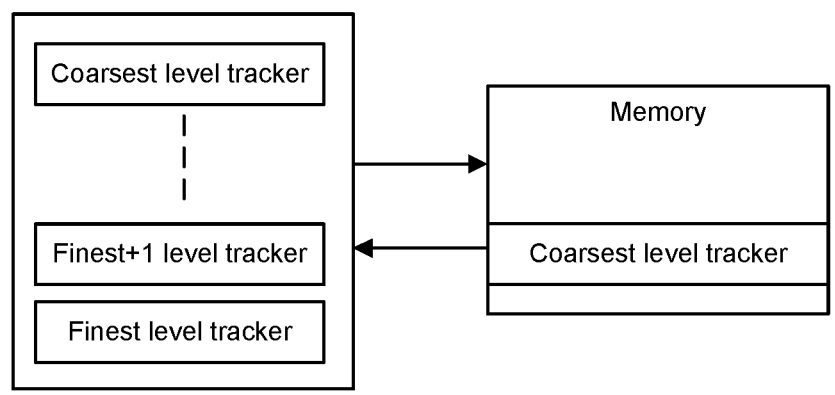
FIG. 3B shows a system for tracking changes to checkpoint data using two or more levels.

FIG. 3B shows a system for tracking changes to checkpoint data using two or more levels. For example, at least a finest grained level tracker (e.g., cache line level), next finest grained level tracker (finest+1 level tracker) (e.g., multiple cache line levels), dense (coarsest level) tracker can be used (e.g., multiple pages). For example, tracking can occur at one or more of a cache line level (whose size can be configured at any size (e.g., 32 bytes, 64, bytes, 128 bytes, 256 bytes, and multiples thereof), groups of multiple cache lines, page level (e.g., 4096 bytes and multiples thereof), or groups of multiple page levels.

Figure 4A:
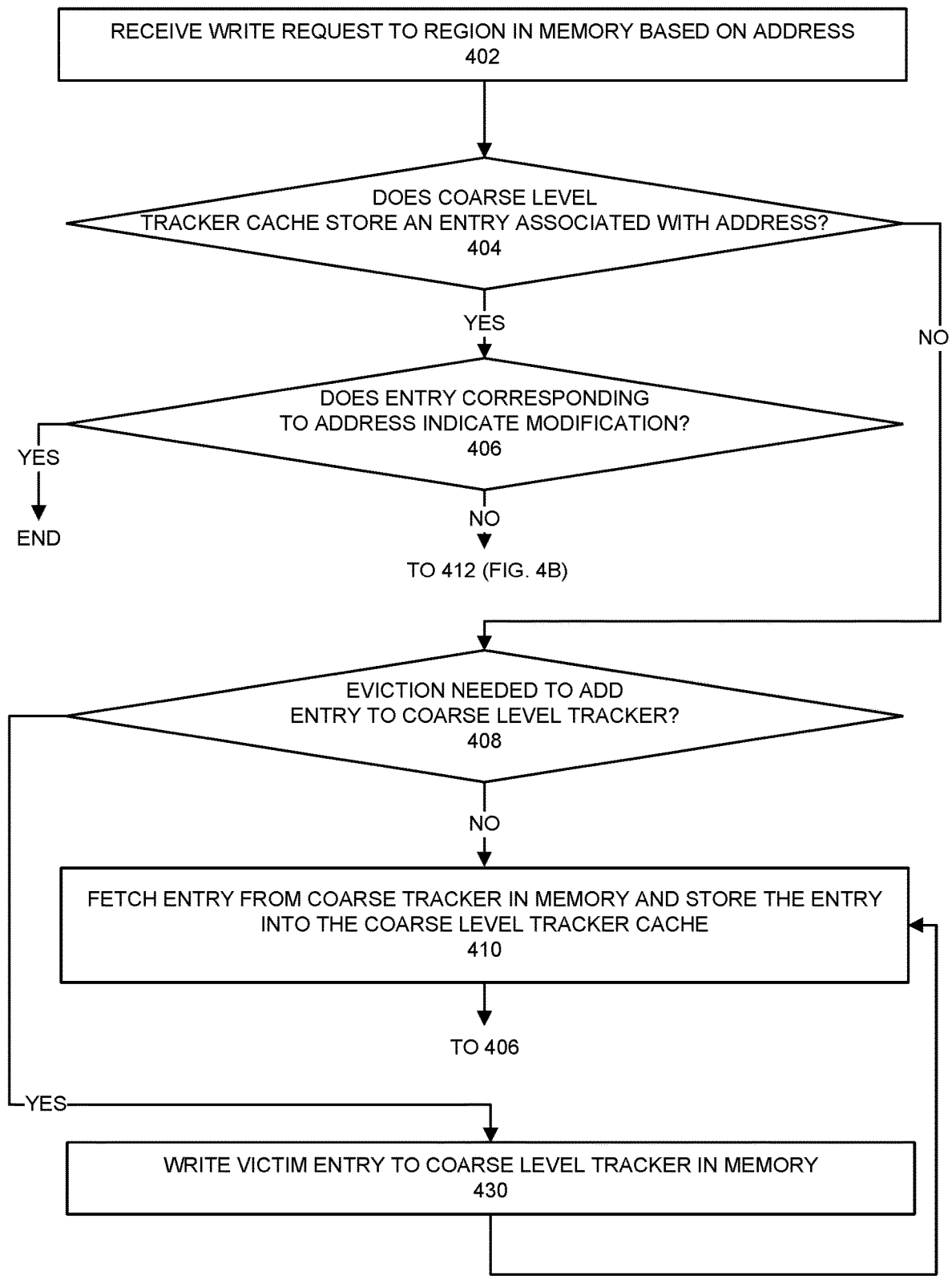
FIGS. 4A-4C depict an example process at least for tracking changes to checkpoint data at fine-grained and/or coarse level granularities.
Figure 4B:
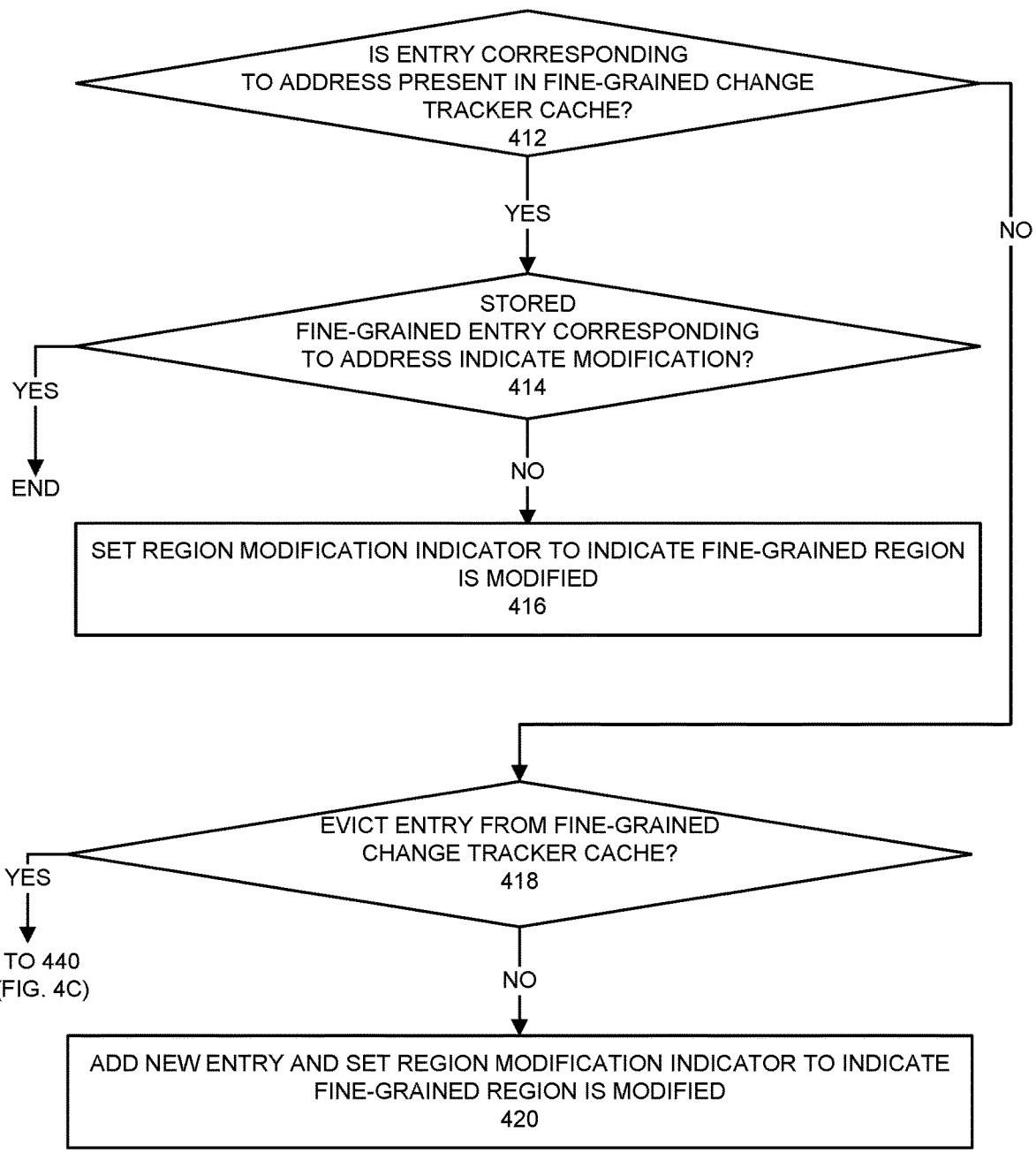
Figure 4C:
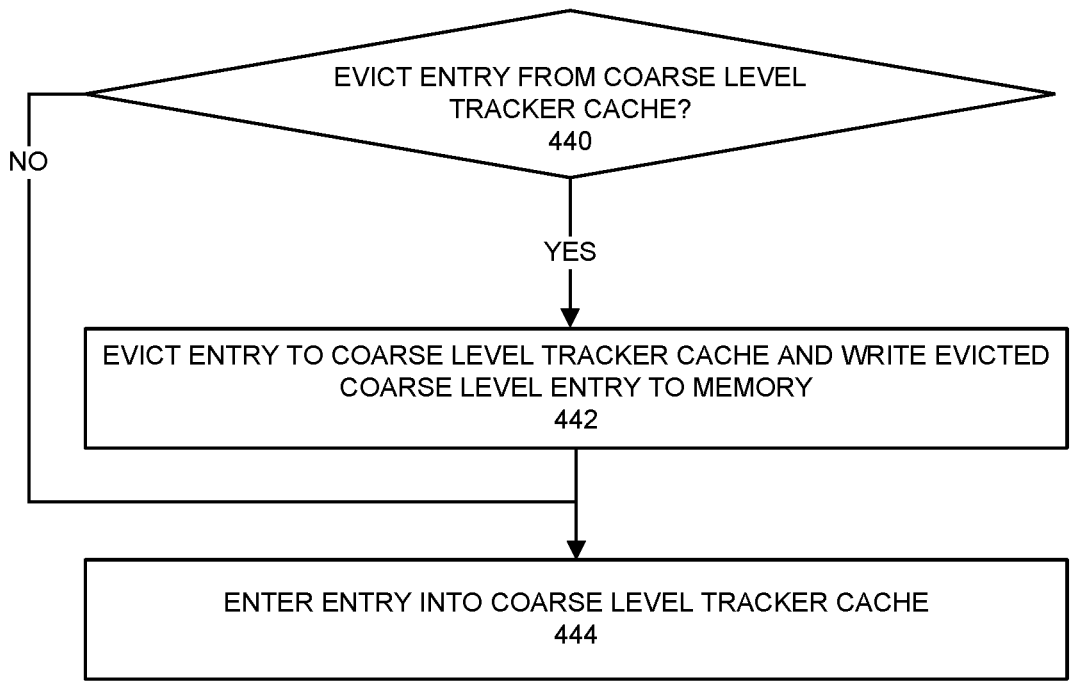

FIGS. 4A-4C depict an example process at least for tracking changes to checkpoint data at fine-grained and/or coarse-grained levels. Referring to FIG. 4A, at 402, a write request is received to write (or change) checkpoint data at a specified address. The write request can specify an address at cache line granularity (e.g., a starting address for a region that is 64 bytes in size (or other sizes)). A memory controller used by a CPU and/or a memory device can receive the write request. Checkpoints could be initiated by a VM at an appropriate time in its execution, or could be initiated periodically by the system. When a checkpoint is initiated, the tracked modified data from the sparse and dense trackers are stored. Tracking modified data is based on whether the address belongs to a tracked memory region.

At 404, a determination is made if a coarse level tracker cache includes an entry associated with the address associated with the write request. The coarse level tracker cache can be used by the memory controller or any other device (e.g., accelerator, network interface, CPU, and so forth). If the coarse level tracker cache includes an entry associated with the address associated with the write request (a hit), the process continues to 406. If the coarse level tracker cache does not include an entry associated with the address associated with the write request (a miss), the process continues to 408.

At 406, a determination is made if a region modification indicator in the entry from the coarse level tracker cache indicates the address region associated with the write request has been identified as modified. For example, the region modification indicator can be embodied as one or more bits that indicate whether a region of memory has been modified. The region of memory can store checkpoint data and the region modification indicator indicates whether checkpoint data in the region [[of has been modified since a prior checkpoint replication procedure or at any time. The region of memory can be a page size.

If the region modification indicator in the entry indicates the address region associated with the write request has been identified as modified, the process can end because changes to checkpoint data at least at a coarse level (e.g., page level) are already accounted for. However, if the region modification indicator in the entry does not indicate the address region associated with the write request has been identified as modified, the process continues to 412 (FIG. 4B).

At 408, a determination is made if an eviction of an entry from the coarse-grained tracker cache is needed for a coarse entry to be added to the coarse-grained tracker cache. For example, an eviction may be applied if the entry to be evicted from the coarse level tracker is a valid entry. An invalid entry in the coarse-grained tracker cache is not evicted and can be overwritten or re-purposed to track changes at the address associated with the write address. If an eviction is not needed, the process continues to 410. If an eviction is to occur, the process continues to 430.

At 410, an entry from the coarse level tracker in memory is fetched and inserted into the coarse level tracker cache. The fetched entry can correspond to a change tracker for at least the address associated with the write request and can identify a coarse level of memory including the memory region associated with the write request as storing updated checkpoint data. In some examples, the dense tracker in memory contains a bit for every page in physical memory, so there is always going to be a corresponding entry in the dense tracker for every page. The entry can overwrite an evicted entry or invalid entry. The entry is identified as valid in the coarse level tracker cache. The process continues to 406 (FIG. 4A).

At 430, the entry evicted from the coarse level tracker cache is written to the coarse level tracker in memory. An entry can be selected for eviction based on a variety of criteria, including one or more of: least recently used (LRU) or an entry with least number of modifications indicated by modified bits, or any other eviction criteria. In some cases, the evicted entry can be marked as invalid in the coarse level tracker cache. The process continues to 410.

Referring to FIG. 4B, at 412, a determination is made if there is an entry in the fine-grained change tracker cache corresponding to an address associated with the write request. If there is a valid entry in the fine-grained change tracker cache corresponding to an address associated with the write request, the process proceeds to 414. If there is no entry in the fine-grained change tracker cache corresponding to an address associated with the write request, the process proceeds to 418. In some examples, if an entry in the fine-grained change tracker cache is invalid, the entry is considered to not be present and the process proceeds to 418.

At 414, a determination is made if the valid entry in the fine-grained change tracker cache corresponding to an address associated with the write request indicates that a modification has been made. For example, the region modification indicator can be embodied as one or more bits that indicate whether a region of memory targeted by the write request has been modified. The region of memory can be a cache-line worth of memory or a region smaller than that tracked by region modification indicators of entries in the coarse level tracker, or other size. The region of memory can store checkpoint data and the region modification indicator indicates whether checkpoint data in the region has been modified since a prior checkpoint procedure or at any time.

At 414, if the region modification indicator in the valid entry indicates the address region associated with the write request has been identified as modified, the process can end because changes to checkpoint data at least at a fine-grained level (e.g., cache-line level) are already accounted for. However, at 414, if the region modification indicator in the valid entry does not indicate the address region associated with the write request has been identified as modified, the process can proceed to 416.

At 416, the entry in the fine-grained change tracker cache corresponding to an address associated with the write request is modified to indicate that a modification has been made to the address associated with the write request. For example, region modification indicator can be set to 1 (or 0) to indicate that a modification has been made to the address associated with the write request. In some examples, tracking changes using an entry in the fine-grained change tracker cache corresponding to an address associated with the write request occurs only if a modified bit is reset (to indicate no modification) in a coarse level tracker associated with the write request.

At 418, a determination is made if an entry is to be evicted from the fine-grained change tracker cache to permit a new entry to be added to the fine-grained change tracker cache. If no entry is to be evicted from the fine-grained change tracker cache, the process continues to 420. If an entry is to be evicted from the fine-grained change tracker cache, the process continues to 440 (FIG. 4C).

At 420, an entry is added to the fine-grained change tracker cache and the new entry is updated to indicate that a modification has been made to the address associated with the write request. For example, adding an entry can include adding a new entry to the fine-grained change tracker cache or using an invalid entry (after clearing its indicators that any modification has been made). A region modification indicator can be set to indicate the address associated with the write request is modified. A tag for the entry can be set as significant bytes of the address associated with the write request. A valid indicator can be set for the entry to indicate the entry is valid. In some examples, tracking changes using an entry in the fine-grained change tracker cache corresponding to an address associated with the write request occurs only if a modified bit is reset (to indicate no modification) in a coarse level tracker associated with the write request.

Referring to FIG. 4C, at 440, a determination is made if an entry is to be evicted from the coarse level tracker cache to make room for tracking of updates at the coarse level instead of fine-grained level due to eviction of an entry from the fine-grained change tracker cache. For example, an invalid entry is present in the coarse level tracker cache, the invalid entry can be overwritten and no eviction is needed. If there is no invalid entry, an entry is to be evicted. If an entry is to be evicted from the coarse level tracker cache to make room for tracking of updates at the coarse level, then the process continues to 442. If an entry is not to be evicted from the coarse-grained tracker cache to make room for tracking of updates at the coarse-grained level, the process continues to 444.

At 442, an entry is selected for eviction from the coarse level tracker cache and the evicted entry can be stored in the coarse grain tracker in memory. A candidate entry for eviction can be an entry with the largest number of region modification indicators set as positive (changed), or any other eviction criteria. In some examples, entries that are candidates for eviction can be identified before an entry is to be evicted.

At 444, an entry is added to the coarse level tracker cache and the added entry is updated to indicate that a modification has been made to the address associated with the write request. For example, adding a new entry can include adding a new entry to the coarse level tracker cache or using an invalid entry (after clearing its indicators that any modification has been made). A region modification indicator can be set to indicate the address associated with the write request is modified. A tag for the entry can be set as significant bytes of the address associated with the write request. A valid indicator can be set for the entry to indicate the entry is valid.

As part of a checkpoint replication procedure, the fine-grained tracker cache, coarse level tracker cache, and coarse level tracker in memory are checked by a virtual machine manager (VMM), hypervisor, orchestrator, or other software to determine what memory addressable parts of the checkpoint data has changed. The checkpoint data with the corresponding region modification indicators set any tracker are read out from the memory device and sent over the network to a destination memory device associated with a replica VM or migrated VM. Note that in some examples, a pointer can be sent to a destination (related to changed or updated checkpoint data) instead of sending data and the receiver can determine when to schedule a retrieval of the content and use a remote direct memory access (RDMA) operation to retrieve the content.

In some examples, after a checkpoint replication process starts (e.g., after a trigger to determine and send changed portions of a specific part or subsection of checkpoint data), if there are new writes issued by a processor, maintaining an order and coherence of the new writes with the checkpoint replication process can be attempted to be achieved. After the checkpoint replication process starts, a processor writes back all the dirty (changed) blocks or regions in the caches to memory, and writes back all entries of the dense (coarse-grained) modified page tracker cache to the modified page tracker cache in memory. Checkpoint data in the memory with its corresponding modified bit set in either the sparse (fine-grained) modified page tracker cache or the dense (coarse-grained) modified page tracker will be read from the memory and sent to a destination memory.

Before all the dirty data in a level 1 (L1) cache has been written back to the next level of cache (e.g., level 2 (L2) cache), the data in the store queue that has been issued after the checkpoint began are not allowed to be written to the L1 cache. However, at or after all the dirty data in the L1 cache has been written to the L2 cache, new data can be stored in the L1 cache. At or after all the dirty data in the next level cache (e.g., L2 cache) has been written to yet another next level cache (e.g. level 3 (L3) cache), the written back dirty data can be evicted from the L1 cache and written into the L2 cache. At or after all the dirty data in the L2 cache has been written to L3 cache, the written back dirty data can be evicted from the L1 cache and written into the L2 cache. Dirty data in the L3 cache can been written to memory and the written back dirty data can be evicted from the L2 cache and written into the L3 cache. Accordingly, the order of the new write requests and the checkpoint replication process can be maintained by using a waterfall approach among tiers of cache.

In some examples, an entity (e.g., VM or container) whose checkpoint data is being monitored can be quiesced from modifying or writing to regions that are monitored for changes until a change set is identified and the changed set is transmitted or cached elsewhere (e.g., as part of a checkpoint replication process).

Figure 5:
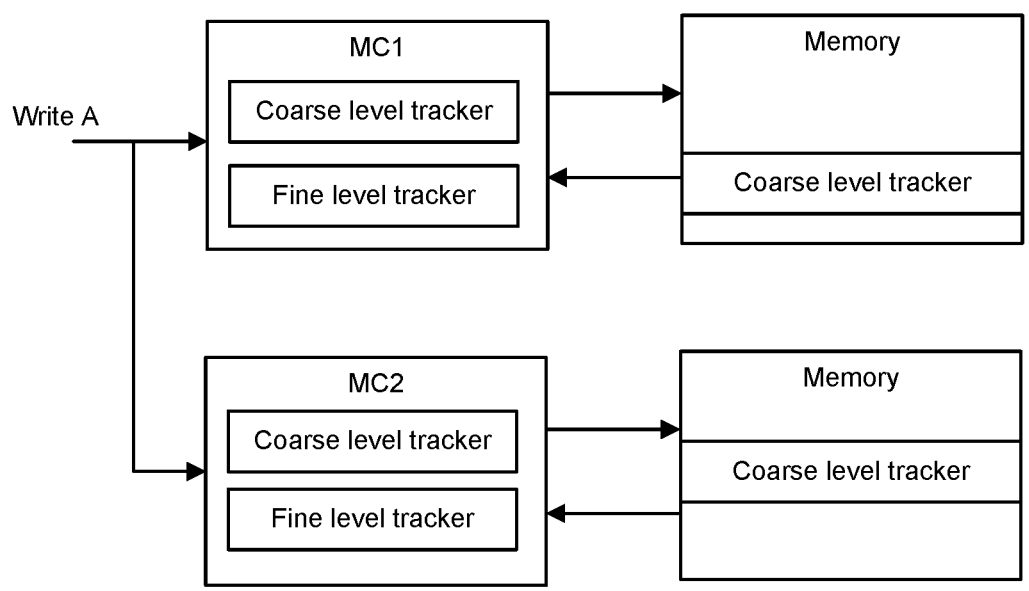
FIG. 5 depicts a system using multiple memory controllers.

There can be various different address mapping schemes for a memory system. Adjustments of the data mapping scheme of the fine-grained and coarse modified page trackers to various address mapping schemes across memory controllers can be used. FIG. 5 depicts a system using multiple memory controllers. In some examples, a memory controller uses its own fine-grained and coarse modified page tracker. The data of the write request and its corresponding trackers do not have to be controlled by the same memory controller such that a memory controller can track pages managed by another memory controller. For instance, a "write A" request is sent to memory. The request will be sent to the memory controller 1 that its address A is mapped to. If address A's corresponding fine-grained and coarse-grained modified page trackers are mapped to a different memory controller (memory controller 2), a separate command will send write A's address to memory controller 2 for accessing the fine-grained and coarse-grained modified page tracker which address A is mapped to. Accordingly, change trackers to checkpoint data can occur at fine-grained and coarse levels despite the fine-grained and coarse level change tracking being managed by another memory controller. Such tracking allows system software to be more efficient by allowing contiguous regions to be specified and transferred, even when data is striped across multiple memory controllers for efficiency.

Figure 6:
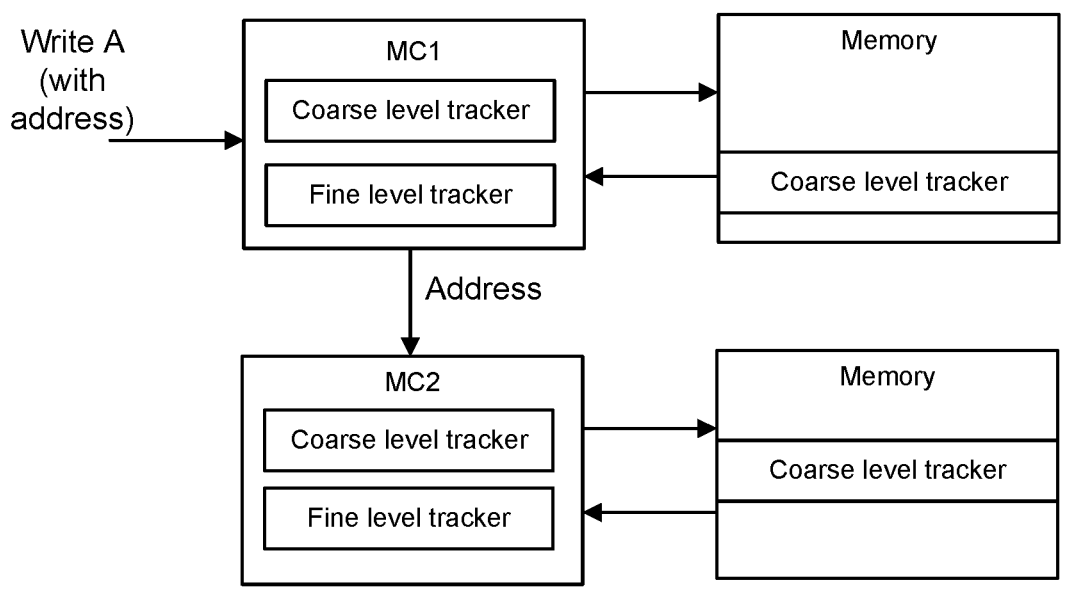
FIG. 6 depicts a system using multiple memory controllers.

FIG. 6 depicts a system using multiple memory controllers. In some examples, fine-grained and coarse-grained modified page trackers keep track of the information of the checkpoint data that is associated with its own memory controller. For instance, modified page trackers used by memory controller 1 are used to keep track of the memory data which is controlled by memory controller 1. In this case, each entry in the fine-grained and coarse-grained modified page trackers is used to track the modified bits in the same row. A row indicates the unit at which memory cells are activated. For example, an 8 KB row means that before reading a cache line, the whole 8 KB row that contains that cache line is activated. The activation latency and power is amortized if multiple cache lines are read/write in the row before closing or pre-charging it and opening another row for the next cache line to be read/written. The fine-grained and coarse modified page tracker are used as a fine-grained and coarse modified "row" tracker. If a single page worth of memory is managed by multiple memory controllers, the fine-grained tracker used by each memory controller tracks modifications that map to that memory controller only, while the coarse-grained level page tracker cache would remain coherent with the coarse-grained page tracker in memory.

It may be desirable for system software (e.g., the VMM) to monitor multiple different regions of memory (for different VMs for example) with different intervals for identifying the memory change sets. Some approaches allow system software to use coarse-grained mechanisms (such as extended page table (EPT) accessed/dirty (A/D) bits) to determine regions which have been potentially modified and perform range-based cache flushes of only those regions before consulting any of the multi-level change trackers including fine-grained trackers. As a result, more of the cache contents could be left intact and the impact on software reduced that was not being checkpointed.

In addition to identifying modified regions, after a successful checkpoint replication, various embodiments change areas to be marked as modified to be unmodified or mark entries as invalid. For concurrency, this needs to be range specific. To help with precisely identifying change sets, system software will typically ensure that no CPU or I/O device will modify tracked regions during change harvesting/tracker reset.

In some examples, in addition to or alternative to embodiments described herein, coarse-grained tracking is performed using memory management unit (MMU) device or process. If fine-grained trackers are present for a region, then fine-grained modification data is used. Otherwise the coarse-grained information is used from conventional MMU mechanism accessed/dirty (A/D) bits or software-logged first modifications to read-only pages). For example, page level A/D information can be consulted in the MMU before using a fine-grained tracker.

Figure 7:
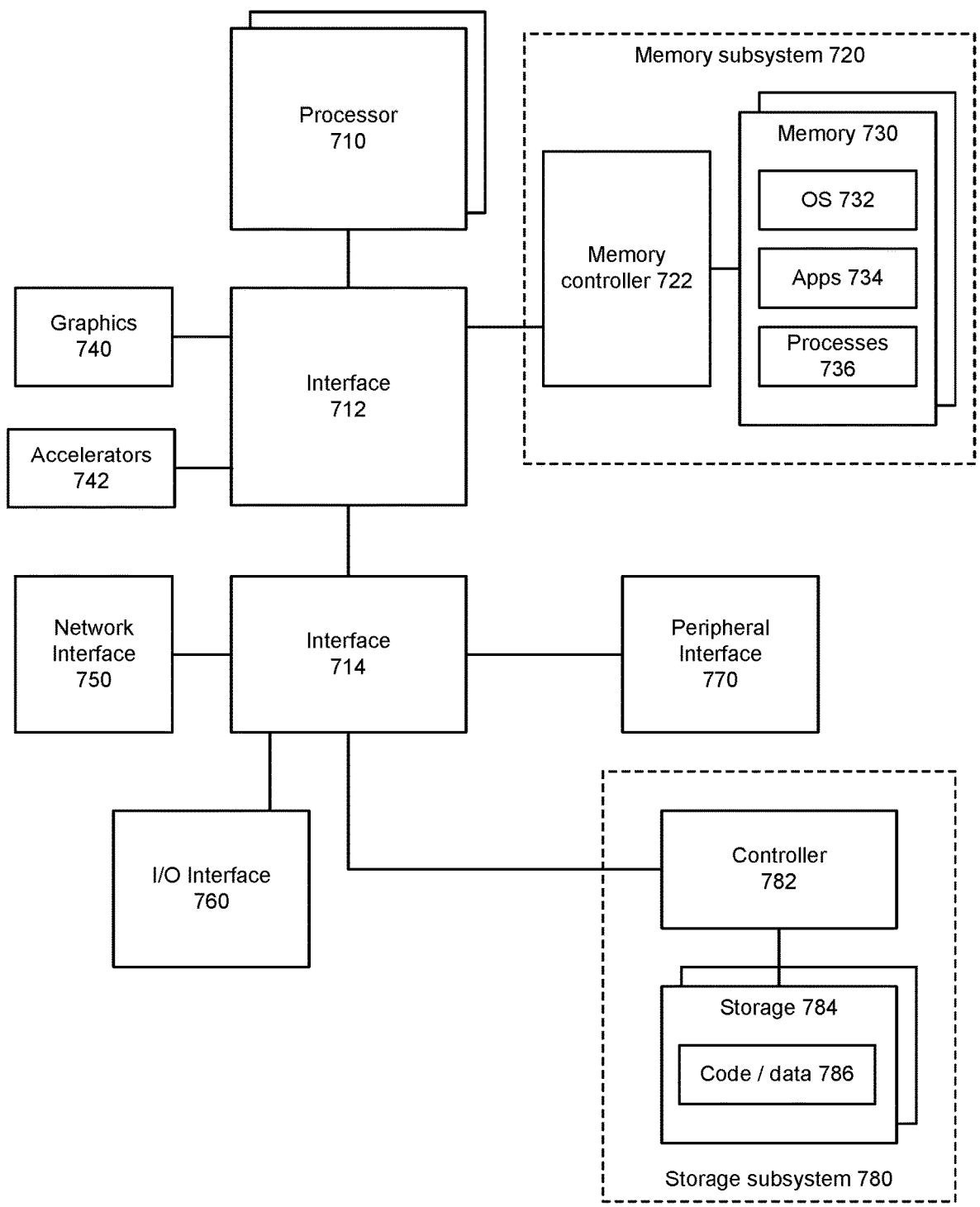
FIG. 7 depicts a system.

FIG. 7 depicts a system. The system can use embodiments described herein to provide data (e.g., updated portions of checkpoint data or other updated portions of content) to or from the system to another device through a mesh or fabric.

System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080 p), retina displays, 4 K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof.

Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes an apparatus comprising: an interface to a memory and a memory controller coupled to the interface, the memory controller to: receive a write request with an associated address to write checkpoint data and use a change tracker to track updates to checkpoint data based on at least two levels of memory region sizes, wherein the at least two levels of memory region sizes comprise a first level and a second level and the first level is associated with a larger memory region size than a memory region size associated with the second level.

Example 2 includes any example, wherein the first level comprises a page level and the second level comprises a cache-line level.

Example 3 includes any example, wherein to track updates to checkpoint data based on at least two levels of memory region sizes comprises: identify that a write to the checkpoint data associated with the write request is tracked based on the write request corresponding to a memory region identified as updated at the first level.

Example 4 includes any example, wherein to track updates to checkpoint data based on at least two levels of memory region sizes comprises: based on the write to the checkpoint data associated with the write request not being tracked at the first level using a first level change tracker, retrieve a first level change tracker for the memory region from memory and identify that the write to the checkpoint data associated with the write request is tracked based on the retrieved first level tracker identifying the memory region associated with the write request as updated.

Example 5 includes any example, wherein to track updates to checkpoint data based on at least two levels of memory region sizes comprises: based on the write to the checkpoint data associated with the write request not being tracked at the first level using a first level change tracker, determine if an update to a portion of the memory region is tracked using a second level tracker and identify that the write to the checkpoint data associated with the write request is tracked based on the update to a portion of the memory region being tracked using a second level tracker.

Example 6 includes any example, wherein to track updates to checkpoint data based on at least two levels of memory region sizes comprises: based on the write to the checkpoint data associated with the write request not being tracked at the first level using a first level change tracker, retrieve a first level change tracker for the memory region; based on the retrieved first level tracker not identifying the memory region as updated, determine if an update to a portion of the memory region is tracked using a second level tracker; and based on the update to a portion of the memory region not being tracked using a second level tracker, use a new second level tracker to track an update to the memory region at the second level.

Example 7 includes any example, wherein to track updates to checkpoint data based on at least two levels of memory region sizes comprises: based on insufficient space being available to store the new second level tracker, evict one or more second level trackers.

Example 8 includes any example, wherein checkpoint data comprises one or more of: configuration information, central processing unit (CPU) architectural state including values of architectural and control registers, memory data changes since the last checkpoint, modified data in cache levels that have not been written back to memory, input/output (I/O) device state, or information needed to bring up a virtual machine (VM) or container to a same state as it was when the checkpoint was taken.

Example 9 includes any example, wherein updated checkpoint data comprises at least checkpoint data updates after a checkpoint data replication.

Example 10 includes any example, wherein based on initiation of a checkpoint data replication, the memory controller is to permit copying of updated checkpoint data to another memory device based on regions of the checkpoint data identified as updated using updates tracked at a first level and a second level.

Example 11 includes any example, wherein a virtual machine manager (VMM) is to cause checkpoint data replication.

Example 12 includes any example, and includes the memory coupled to the interface and further comprising one or more of: a processor, server, data center.

Example 13 includes a computer-implemented method comprising: tracking updates to checkpoint data at first and second levels of granularity of memory region size, wherein the first level is coarser than the second level and during a checkpoint replication, transferring merely updated portions of checkpoint data to another memory device based on the update tracking at first and second levels of granularity, wherein the updated portions correspond to sizes of memory regions that are identified as updated at either first or second level of granularity.

Example 14 includes any example, wherein the first level comprises a page level and the second level comprises a cache-line level.

Example 15 includes any example, and including receiving a write request and identifying that an update to the checkpoint data associated with the write request is tracked based on a write request corresponding to a memory region identified as updated at the first level.

Example 16 includes any example and includes: receiving a write request; retrieving a second level tracker of an update to a portion of the memory region; and identifying that an update to the checkpoint data associated with the write request is tracked based on the update to a portion of the memory region being tracked using the second level tracker.

Example 17 includes a system comprising: a memory; a memory controller; a processor; and a network interface, wherein the memory controller is to: monitor for updates of checkpoint data stored in the memory; track any update to the checkpoint data using an update tracker at either a first level of granularity or second level of granularity, wherein the first level of granularity corresponds to a memory region of a first size and the second level of granularity corresponds to a memory region of a second size, wherein the first size is larger than the second size; and for a checkpoint replication operation, permit copying of updated regions of the checkpoint data as identified using the update tracker.

Example 18 includes any example, wherein the first level comprises a page level and the second level comprises a cache-line level.

Example 19 includes any example, wherein the network interface is to transmit updated regions of the checkpoint data to another memory device.

Example 20 includes any example, wherein the memory controller is to track any update to the checkpoint data at a second level unless an update was tracked at the first level.

What is claimed is:

1. An apparatus comprising:
   an interface to a memory and
   a memory controller coupled to the interface, the memory controller to:
   receive a write request with an associated address to write checkpoint data and
   use a change tracker to track updates to checkpoint data based on at least two levels of memory region sizes, wherein the track updates to checkpoint data based on at least two levels of memory region sizes comprises:
   based on a write to the checkpoint data associated with the write request not being tracked at a first level using a first level change tracker, retrieve a first level change tracker for a memory region;
   based on the retrieved first level change tracker not identifying the memory region as updated, determine if an update to a portion of the memory region is tracked using a second level tracker;
   based on the update to a portion of the memory region not being tracked using a the second level tracker, use an updated second level tracker to track an update to the memory region at the second level; and based on insufficient space being available to store the updated second level tracker, evict one or more second level trackers; and wherein the at least two levels of memory region sizes comprise:

a first level and a second level, wherein:

the first level is associated with a first memory region size, the second level is associated with a second memory region size, and the first memory region size is larger than the second memory region size.

2. The apparatus of claim 1, wherein the first memory region size comprises a page level and the second memory region size comprises a cache-line level.

3. The apparatus of claim 1, wherein to track updates to checkpoint data based on at least two levels of memory region sizes comprises:

identify that a write to the checkpoint data associated with the write request is tracked based on the write request corresponding to a memory region identified as updated at the first level.

4. The apparatus of claim 1, wherein to track updates to checkpoint data based on at least two levels of memory region sizes comprises:

based on the write to the checkpoint data associated with the write request not being tracked at the first level using a first level change tracker, retrieve a first level change tracker for a memory region associated with the write request from memory and identify that the write to the checkpoint data associated with the write request is tracked based on the retrieved first level tracker identifying a memory region associated with the write request as updated.

5. The apparatus of claim 1, wherein to track updates to checkpoint data based on at least two levels of memory region sizes comprises:

based on the write to the checkpoint data associated with the write request not being tracked at the first level using a first level change tracker, determine if an update to a portion of a memory region associated with the write request is tracked using a second level tracker and identify that the write to the checkpoint data associated with the write request is tracked based on the update to a portion of the memory region being tracked using the second level tracker.

6. The apparatus of claim 1, wherein checkpoint data comprises one or more of:

configuration information, central processing unit (CPU) architectural state including values of architectural and control registers, memory data changes since the last checkpoint, modified data in cache levels that have not been written back to memory, input/output (I/O) device state, or information needed to bring up a virtual machine (VM) or container to a same state as it was when the checkpoint was taken.

7. The apparatus of claim 1, wherein updated checkpoint data comprises at least checkpoint data updates after a checkpoint data replication.

8. The apparatus of claim 1, wherein based on initiation of a checkpoint data replication, the memory controller is to permit copying of updated checkpoint data to another memory device based on regions of the checkpoint data identified as updated using updates tracked at the first level and the second level.

9. The apparatus of claim 1, wherein a virtual machine manager (VMM) is to cause checkpoint data replication.

10. The apparatus of claim 1, further comprising the memory coupled to the interface and further comprising one or more of: a processor, server, data center.

11. A computer-implemented method comprising:

receiving, by a memory controller coupled to an interface to a memory, a write request with an associated address to write checkpoint data and tracking, by a change tracker of the memory controller, updates to checkpoint data based on at least two levels of memory region sizes, wherein the tracking comprises:

based on a write to the checkpoint data associated with the write request not being tracked at a first level using a first level change tracker, retrieving a first level change tracker for a memory region;

based on the retrieved first level change tracker not identifying the memory region as updated, determining if an update to a portion of the memory region is tracked using a second level tracker;

based on the update to a portion of the memory region not being tracked using the second level tracker, using an updated second level tracker to track an update to the memory region at the second level; and based on insufficient space being available to store the updated second level tracker, evicting one or more second level trackers; and wherein the at least two levels of memory region sizes comprise:

a first level and a second level, wherein:

the first level is associated with a first memory region size, the second level is associated with a second memory region size, and the first memory region size is larger than the second memory region size; and during a checkpoint replication, transferring updated portions of checkpoint data to another memory device as tracked by the first and second level trackers, wherein the updated portions correspond to sizes of memory regions that are identified as updated at the first level and/or the second level of.

12. The method of claim 11, wherein the first level comprises a page level and the second level comprises a cache-line level.

13. The method of claim 11, comprising:

identifying that an update to the checkpoint data associated with the write request is tracked based on a write request corresponding to a memory region identified as updated at the first level.

14. The method of claim 11, comprising:

identifying that an update to the checkpoint data associated with the write request is tracked based on the update to a portion of the memory region associated with the write request being tracked using the second level tracker.

15. A system comprising:

a memory;

a memory controller;

a processor; and a network interface, wherein the memory controller is to:

receive a write request with an associated address to write checkpoint data and use a change tracker to track updates to checkpoint data based on at least two levels of memory region sizes, wherein the track updates to checkpoint data based on at least two levels of memory region sizes comprise:
based on a write to the checkpoint data associated with the write request not being tracked at a first level using a first level change tracker, retrieve a first level change tracker for the memory region;
based on the retrieved first level change tracker not identifying the memory region as updated, determine if an update to a portion of the memory region is tracked using a second level tracker;
based on the update to a portion of the memory region not being tracked using the second level tracker, use an updated second level tracker to track an update to the memory region at the second level; and
based on insufficient space being available to store the updated second level tracker, evict one or more second level trackers; and
wherein the at least two levels of memory region sizes comprise:
a first level and a second level,
wherein:
the first level is associated with a first memory region size,
the second level is associated with a second memory region size, and
the first memory region size is larger than the second memory region size; and
for a checkpoint replication operation, permit copying of updated regions of the checkpoint data as identified using the first and second level trackers.

16. The system of claim 15, wherein the first level comprises a page level and the second level comprises a cache-line level.

17. The system of claim 15, wherein the network interface is to transmit updated regions of the checkpoint data to another memory device.

18. The system of claim 15, wherein the memory controller is to track one or more updates to the checkpoint data at a second level unless an update is tracked at the first level.

* * * * *